Aug. 2, 1938.    H. J. C. WELLS    2,125,532
CONTINUOUS FLOW STRAINER
Filed Jan. 22, 1936
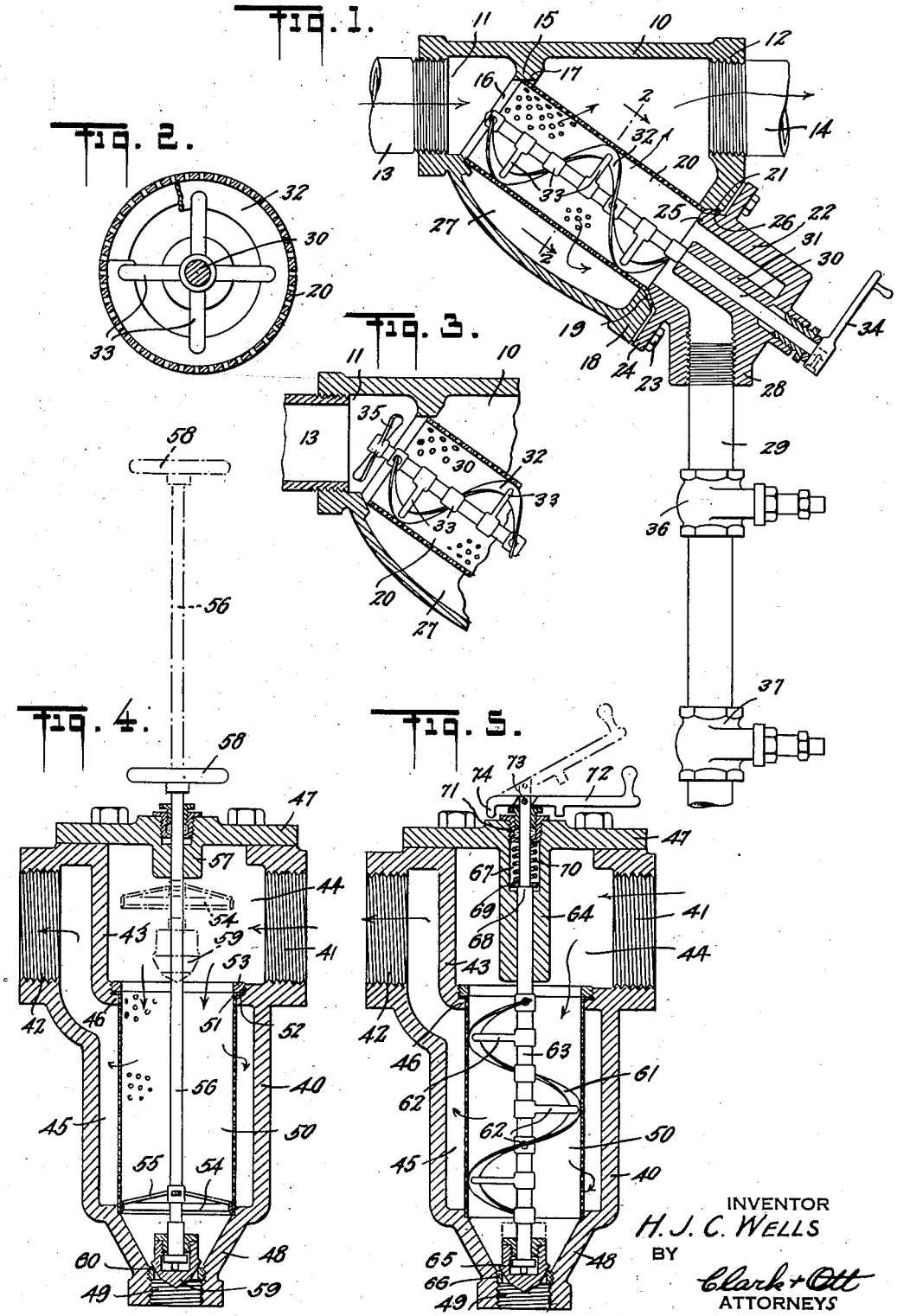
INVENTOR
H. J. C. WELLS
BY
Clark + Ott
ATTORNEYS Patented Aug. 2, 1938

2,125,532

UNITED STATES PATENT OFFICE 2,125,532

CONTINUOUS FLOW STRAINER

Herbert James Clement Wells,
Jackson Heights, N. Y.

Application January 22, 1936, Serial No. 60,216

3 Claims. (Cl. 210—167)

This invention relates to strainers of the type which are interposed in a fluid line for intercepting and removing from the fluid passing through the line, dirt, scale or other foreign matter and the invention broadly comprehends means for dislodging or freeing from the surface of the strainer element the foreign matter intercepted thereby and adhering thereto.

The invention also contemplates an improved fluid strainer of the indicated character which is so constructed and arranged as to permit of the cleaning of the strainer element without interrupting the flow of the fluid through the line.

More particularly the invention resides in a strainer for fluid lines which includes a tubular foraminous element through which the fluid is constrained to pass, together with a scraper movable over the surface thereof for dislodging therefrom the foreign matter intercepted thereby and adhering thereto without the necessity of disrupting the flow of the fluid through the line.

The invention further includes a strainer body, a strainer element mounted within the body, a scraper mounted within the strainer body for relative movement over the surface of the strainer element and a handle located exteriorly of the strainer body operatively connected with the scraper for the manual actuation thereof for removing the foreign matter intercepted by and adhering to the strainer element without interruption of the flow of the fluid through the strainer body.

The invention also contemplates in a continuous flow strainer, a strainer body having an opening for the discharge of foreign matter and a valve seat surrounding said opening, a scraper mounted within the body for relative movement over the surface of the strainer element and provided at one end with a valve head adapted to engage with said valve seat for closing the discharge opening, and a handle located exteriorly of the strainer body operatively connected with the scraper for manual actuation thereof and for moving the said valve head into and out of engagement with the valve seat.

The invention also embodies as a further feature thereof means connected with the scraper and operable by the flow of the fluid through the strainer casing for actuating said scraper so as to constantly remove foreign matter intercepted by the strainer element.

With the above and other objects in view, reference is now made to the following specification and accompanying drawing in which there is illustrated by way of example, several preferred forms of the invention, while the appended claims cover other variations and modifications thereof which fall within the scope of the invention.

In the drawing:

Fig. 1 is a longitudinal sectional view through a strainer constructed in accordance with the invention.

Fig. 2 is an enlarged transverse sectional view through the strainer element and scraper taken approximately on line 2—2 of Fig. 1.

Fig. 3 is a fragmentary longitudinal sectional view illustrating a modified form of the scraper actuating means illustrated in Fig. 1.

Figs. 4 and 5 are longitudinal sectional views through strainers illustrating further modifications of the invention.

Referring to the drawing by characters of reference, the invention as illustrated in Figs. 1 and 2 includes a strainer body or casing 10 having a fluid inlet 11 and a fluid outlet 12 disposed in axial alignment with which the pipe sections 13 and 14 of the fluid line respectively communicate. The casing or body 10 is provided with a partition 15 adjacent the inlet 11 which is disposed at an angle to the axis of the inlet and is provided with a passage 16 defining a frusto-conical seat 17. The casing or body is provided with an angularly disposed wall 18 having a frusto-conical opening or port 19 disposed in axial alignment with the seat 17.

A strainer element consisting of a foraminous tube 20 having a flared frusto-conical terminal 21 is inserted through the opening or port 19 with the flared terminal 21 engaging the frusto-conical port or opening 19 and with the opposite end engaging the frusto-conical seat 17. A cap 22 is removably secured to the wall 18 by means of bolts, screws or other fastening devices 23 which extend through a flange 24 adjacent the inner end 25 of the cap, which inner end is formed with a frusto-conical periphery 26 adapted to engage within the frusto-conical terminal 21 of the strainer element 20 and clamp said strainer element in position within the casing or body 10 with the forward end of the strainer element impinging against the seat 17. The open forward end of the strainer element 20 is thereby disposed in open communication with the fluid which enters the casing through the intake 11, while the opposite end of the strainer is closed by the cap 22. The fluid is therefore caused to pass through the strainer element 20 before entering the chamber 27 which surrounds the strainer element and communicates with the outlet 12. The cap 22 is provided with a depending outlet boss 28 connected with a clean out pipe 29 for conveying away the foreign matter intercepted by the strainer element.

In order to provide means for dislodging the foreign matter intercepted by the strainer element and adhering to the inner surface thereof, a scraper is provided which includes a rotary shaft 30 journaled in a bearing 31 in the cap 22 and which shaft protrudes from the inner end of the cap and extends axially through the strainer element 20. A helical scraper blade 32 having continuous engagement with the inner surface of the strainer element 20 is secured to and supported by the protruding portion of the shaft 30 by longitudinally spaced radial arms 33 for rotation with the shaft.

Rotation may be manually imparted to the shaft 30 for actuating the scraper by a crank handle 34 secured to the end of the shaft which protrudes through the outer end of the cap. If desired, the shaft 30 may be continuously rotated by the force of the fluid flowing through the strainer casing and such an arrangement is illustrated in Fig. 3 wherein a propeller 35 is secured to the forward end of the shaft 30 where it is acted upon by the incoming fluid entering the casing through the inlet 11.

In order to avoid interruption of the flow when conveying away the foreign matter which has been collected in the clean-out pipe 29, said pipe may be provided with spaced valves 36 and 37, it being understood that the valves are successively opened and closed to discharge the foreign matter.

In the forms of the invention illustrated in Figs. 4 and 5 of the drawing, 40 designates the body of a pot strainer having a fluid inlet 41 and a fluid outlet 42 disposed in axial alignment, the body being subdivided by a partition 43 into an inlet chamber 44 and an outlet chamber 45, the partition being provided with an opening 46 disposed on an axis perpendicular to the axes of the inlet and outlet and the upper portion of the inner chamber 44 which opens through the casing being covered by a removable cap 47. The lower end of the casing 40 is provided with a reduced depending boss 48 having a discharge port 49 which is adapted to be connected with a clean-out pipe. A tubular foraminous strainer element 50 having a flange 51 at its upper end is arranged within the casing 40 and extends downwardly through the opening 46 to and engages within the upper portion of the boss 48, the flange 51 being seated on a shoulder 52 within the opening 46 and being secured in place by a clamp ring 53.

As illustrated in Fig. 4, an annular scraper element or ring 54 is provided which is adapted to be moved axially of the strainer element 50 over the inner surface and throughout the length thereof for dislodging therefrom foreign matter which is intercepted by and adheres to the strainer element. The scraper ring 54 is attached by spider arms 55 to a stem 56 which extends axially through the strainer element and is mounted for guided longitudinal movement in a bearing boss 57 on the underside of the cap 47, the upper end of the stem protruding above the cap and being provided with a manipulating knob 58. The stem 56 is provided at its lower end with a valve head 59 which is adapted to engage a valve seat 60 which is provided adjacent the lower end of the boss 48. Normally the stem is arranged in the lower full line position shown in Fig. 4 with the scraper ring 54 at the lower end of the strainer element 50 and with the valve 59 in seated relation to the seat 60 to close the discharge port 49. When it is desired to dislodge foreign matter intercepted by and adhering to the inner surface of the strainer element 50, the manipulating knob 58 is grasped and a pull is exerted upwardly thereon to slide the scraper ring 54 lengthwise of the strainer element 50. This simultaneously unseats the valve head 59 from its seat 60 to open the clean-out port 49 as illustrated by the broken lines in Fig. 4. The stem is subsequently returned to its normal position with the scraper ring 54 at the lower end of the strainer element and the valve head 59 engaging its seat to close the discharge port 49.

In the form of the invention illustrated in Fig. 5, the scraper includes a helical blade 61 having continuous engagement with the inner surface of the strainer element 50 and the said blade is secured by radial arms 62 to a shaft 63 extending axially through the strainer element 50 and journaled at its upper end in a depending bearing boss 64 on the underside of the cap 47. A valve head 65 is swivelled to the lower end of the shaft 63 and is adapted to engage with a valve seat 66 adjacent the lower end of the boss 48 for closing the discharge port 49. The upper end of the stem is provided with a reduced terminal 67 providing a shoulder 68 for a spring seat 69 and a coiled expansion spring 70 surrounds the reduced terminal and bears at its lower end against the spring seat 69 with the upper end engaging a plug 71 threaded into the cap 47. The spring 70 functions to normally maintain the valve head 65 in seated relation to the valve seat 66, while permitting the shaft 63 to rotate with reference thereto. The reduced terminal 67 of the shaft 63 extends upwardly through and protrudes from the cap 47. A crank handle 72 is fulcrumed to the protruding upper end of the shaft extremity 67 on a transverse pivot 73 and the crank handle is provided with a downturned extremity 74 so as to serve in addition to means for rotating the scraper blade 61, a lever means for unseating the valve head 65 from its seat by swinging the same on its fulcrum 73 with the downturned extremity engaging the upper surface of the cap 47 as shown in broken lines in Fig. 5 of the drawing.

What is claimed is:

1. A strainer for fluid lines including a casing having a fluid inlet, a fluid outlet and a foreign matter discharge outlet, a hollow cap removably associated with the casing in covering relation with the foreign matter discharge outlet, a tubular strainer within the casing communicating respectively at its opposite ends with the fluid inlet and the foreign matter discharge outlet and intercepting the flow of fluid from the inlet to the fluid outlet, and a scraper including a shaft journaled for rotation within the casing and having an operating portion exterior thereof and a helical scraper blade connected to and spaced from the shaft to permit of the flow of the fluid between the blade and the shaft, said blade having its outer edge engaging the inner surface of the strainer to dislodge and deposit within the cap foreign matter intercepted by the strainer.

2. A strainer for fluid lines including a casing having a fluid inlet and a fluid outlet, an inclined partition within the casing interposed between the inlet and outlet and having an opening with a frusto-conical face, said casing having a lower wall parallel to the partition provided with an opening in alignment with the partition opening, a hollow cap removably associated with the lower casing wall in covering relation to the opening therein and defining a trap pocket, an open ended inclined cylindrical screen extending from the partition opening to the opening in the lower casing wall and impinged against the frusto-conical face of the partition opening by said cap, an inclined rotary helical scraper member mounted within the screen and an operating shaft connected to said scraper in spaced relation therewith to permit of the flow of the fluid between said scraper and shaft, said shaft being journaled at one end in said cap with a manipulating handle disposed exterior of the casing for rotating the scraper to dislodge foreign matter intercepted by the screen and for depositing the same within the trap pocket.

3. A strainer for fluid lines including a casing having a fluid inlet and a fluid outlet, an inclined partition within the casing interposed between the inlet and outlet and having an opening with a frusto-conical face, said casing having a foreign matter discharge outlet, an open ended inclined cylindrical screen extending from the partition opening to the foreign matter discharge outlet and having a frusto-conical flanged end, a hollow cap defining a trap pocket removably associated with the casing in covering relation to the foreign matter discharge outlet and having a frusto-conical face at its inner end impinging against the frusto-conical flanged end of the screen to hold the opposite ends of the screen in seated relation with said frusto-conical faces, an inclined shaft journaled for rotation in the cap and having an exteriorly disposed manipulating handle and an inclined helical scraper blade supported by the shaft in spaced relation therewith to engage with the inner surface of the screen for dislodging foreign matter intercepted thereby and for depositing the same within the trap pocket.

HERBERT JAMES CLEMENT WELLS.